Nov. 18, 1941.         H. E. ALMER              2,262,875
                         VISOR LAMP
                    Filed April 17, 1940         2 Sheets-Sheet 1
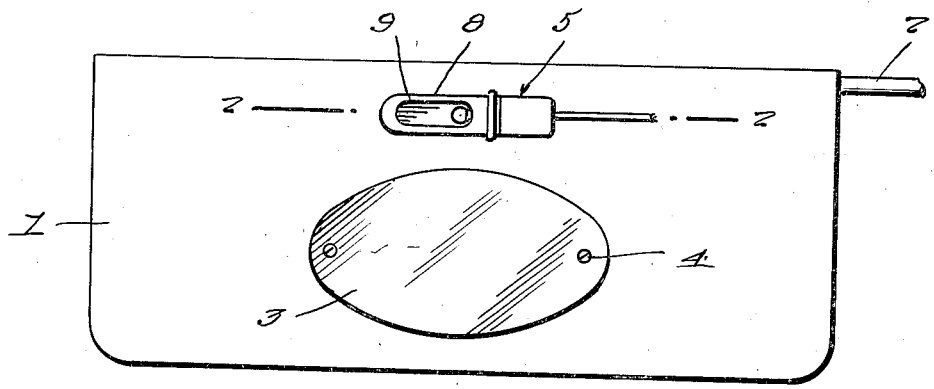
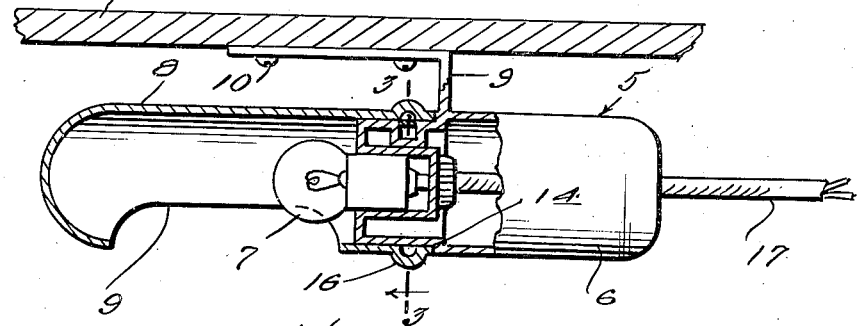
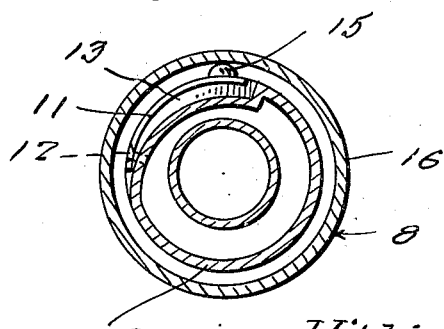
Inventor
Hilding E. Almer
By Clarence A. O'Brien
Attorneys Nov. 18, 1941.   H. E. ALMER   2,262,875
VISOR LAMP
Filed April 17, 1940   2 Sheets-Sheet 2

Inventor
Hilding E. Almer
By Clarence A. O'Brien
Attorneys

Patented Nov. 18, 1941

2,262,875

UNITED STATES PATENT OFFICE 2,262,875

VISOR LAMP

Hilding E. Almer, El Paso, Tex., assignor of one-fourth to Martha Almer, St. Peter, Minn.

Application April 17, 1940, Serial No. 330,176

1 Claim. (Cl. 240—4.2)

This invention relates to a lamp for illuminating the face of a person using the vanity mirror of an automobile, the general object of the invention being to so arrange the lamp with respect to the mirror that one looking into the mirror will have his or her face illuminated by the rays of light from the lamp.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which—

Figure 1 is an elevational view showing the relative location of the lamp with respect to a vanity mirror mounted on a visor of an automobile.

Figure 2 is a section on the line 2—2 of Figure 1.

Figure 3 is a section on the line 3—3 of Figure 2.

Figure 4:
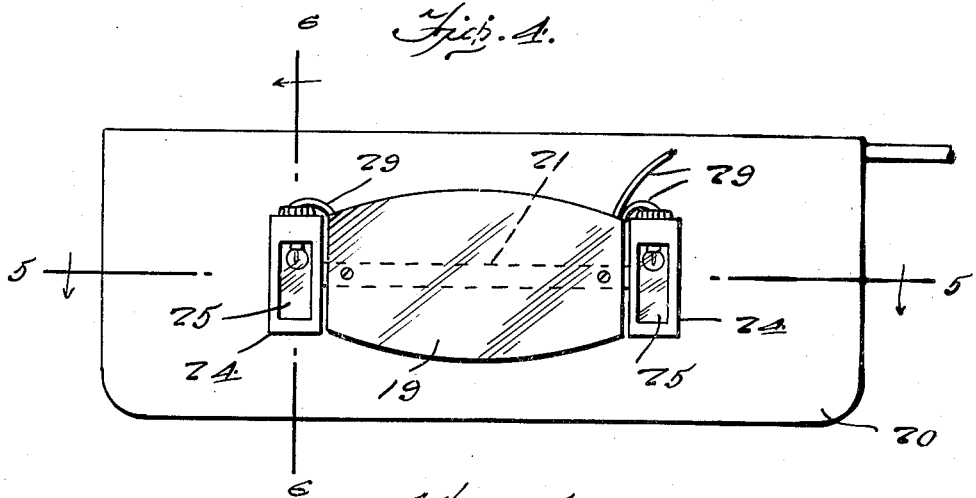
Figure 4 is a view similar to Figure 1 but showing a modification of the invention.

In these drawings the visor is shown at 1 and a portion of the supporting means at 2 and the mirror is shown at 3 and is attached to the visor in any suitable manner such as by means of the screws 4.

The improved lamp is shown at 5 and is arranged above the mirror and said lamp includes an electric light socket 6, a light bulb 7 suitably secured in one end of the socket for removal therefrom, and an elongated cylindrical hood 8 detachably attached at one end to the socket 6, as presently described, and extending endwise over the bulb 7, the hood having a longitudinally extending opening 9 therein for projection of light therethrough emanating from said bulb. The lamp 5 is secured to the visor 1 to extend lengthwise horizontally over the top of the mirror 3 and by means of a right angled bracket 9 connected with the socket 6 and attached to the visor 1 by screws 10.

The attaching means for the hood 8 comprises a curved leaf spring 11 secured at one end, as at 12, to the socket 6 adjacent one end of the latter to extend circumferentially of the socket and react outwardly thereof, said spring being opposed to a circumferential groove 13 and in said end of the socket 6 into which the spring may be flexed. The end of the socket 6 to which the spring 11 is secured is reduced in diameter to form a shoulder 14 on said socket for a purpose presently seen. The free end of the spring 11 has thereon a rounded catch member 15 normally urged outwardly of the groove 13 by the spring 11. The attaching end of the hood 8 fits telescopically over said reduced end of the socket 6 and is provided with a circumferential bead 16 forming an internal groove in said end of the hood into which the spring urged catch 15 enters with a snap action when said hood is fitted over said socket with its end engaging the shoulder 14. As will be understood, the described attaching means provides for rotation of the hood 8 to adjust the slot 9 thereof so as to properly direct the light rays toward the face of one looking into the mirror 3.

The light bulb 7 may be energized from the automobile battery, not shown, in any suitable manner, a cable 17 being provided for that purpose to extend into the socket 6 and to which the bulb 7 may be electrically connected in the usual manner well understood in the art.

Figure 5:
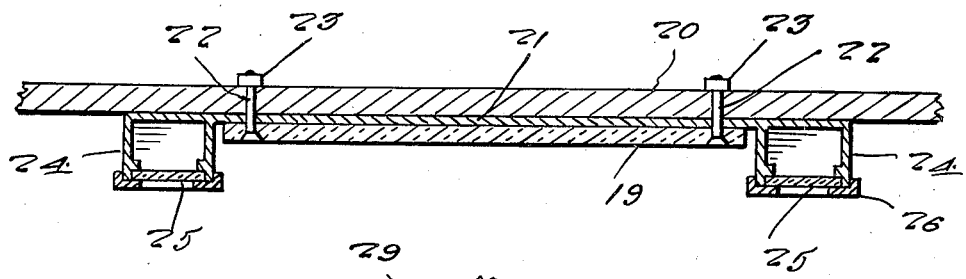
Figure 5 is a section on the line 5—5 of Figure 4.
Figure 6:
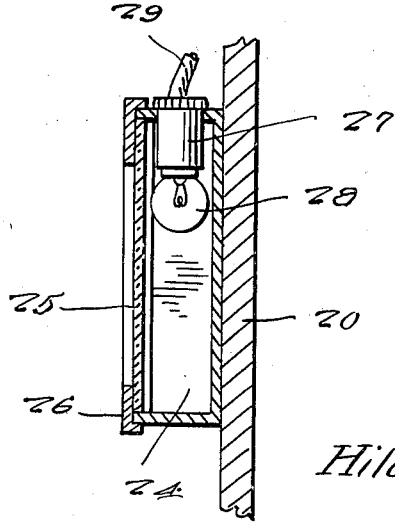
Figure 6 is a section on the line 6—6 of Figure 4.

In that form of the invention shown in Figures 4, 5 and 6 a pair of lamps are provided, one of which is located at each end of the mirror 19 of the visor 20. Each lamp is in the form of a box-like housing 24 and these housings are connected with the ends of a bar 21 passing under the mirror and bolts 22 with their nuts 23 connect the mirror, bar 21 and the visor 20 together as shown more particularly in Figure 5.

Said housings 24 have glass panels 25 set into the front sides thereof and removably secured to the housings by keeper frames 26 fitting over the front sides of the housings and suitably secured thereto. Each housing 24 has depending from the top thereof and into the same an electric light socket 27 for an electric light bulb 28. Line connections 29 extend from the sockets 27 for connection in any suitable manner to the battery circuit of the automobile.

As will be seen with the two lamps arranged as specified the rays of the light therefrom will thoroughly illuminate the face of one looking into the mirror as said rays will strike both sides of the face.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In combination with a sun visor having a mirror thereon, lamp means connected with the visor and including means for directing the rays of light upon the face of one looking into the mirror, said lamp including a bulb carrying socket mounted on the visor in horizontally extending position directly over the top of said mirror, a hood for the lamp fitting over one end of the socket, and snap action means to detachably attach the hood to said end of the socket comprising a circumferential groove in the socket, a leaf spring anchored at one end in said groove and having a button-like free end reacting outwardly of the groove, and a circumferential internal groove in the hood for receiving said button-like end.

HILDING E. ALMER.